(12) United States Patent
Ogden et al.

(10) Patent No.: US 11,745,874 B2
(45) Date of Patent: Sep. 5, 2023

(54) UNMANNED AERIAL VEHICLE RECOVERY SYSTEMS AND METHODS

(71) Applicant: AVSS-AERIAL VEHICLE SAFETY SOLUTIONS INC., Quispamsis (CA)

(72) Inventors: Josh Ogden, Quispamsis (CA); Josh Boudreau, Ottawa (CA); Robert D. Watters, Ottawa (CA); Mike Sirois, Ottawa (CA); Luc Boucher, Ottawa (CA); Etienne Poisson, Ottawa (CA)

(73) Assignee: AVSS—AERIAL VEHICLE SAFETY SOLUTIONS INC., Quispamsis (CA)

( * ) Notice: Subject to any disclaimer, the term of this patent is extended or adjusted under 35 U.S.C. 154(b) by 404 days.

(21) Appl. No.: 17/048,414

(22) PCT Filed: Apr. 17, 2019

(86) PCT No.: PCT/IB2019/053196
§ 371 (c)(1),
(2) Date: Oct. 16, 2020

(87) PCT Pub. No.: WO2019/202533
PCT Pub. Date: Oct. 24, 2019

(65) Prior Publication Data
US 2021/0155343 A1 May 27, 2021

Related U.S. Application Data

(60) Provisional application No. 62/812,686, filed on Mar. 1, 2019, provisional application No. 62/658,973, filed on Apr. 17, 2018.

(51) Int. Cl.
*B64C 9/02* (2006.01)
*B64C 39/02* (2023.01)
(Continued)

(52) U.S. Cl.
CPC ............ *B64C 39/024* (2013.01); *B64D 17/70* (2013.01); *B64D 17/80* (2013.01); *B64U 70/83* (2023.01); *B64U 2201/20* (2023.01)

(58) Field of Classification Search
CPC .... B64D 17/20; B64D 17/80; B64D 2201/20; B64U 70/83
See application file for complete search history.

(56) References Cited

U.S. PATENT DOCUMENTS 9,611,044 B2 4/2017 Hiisilä
10,112,721 B2 * 10/2018 Sweeny ................. B64D 17/80
(Continued)

FOREIGN PATENT DOCUMENTS

CN 104071340 A 10/2014
CN 205327429 U 6/2016
(Continued)

OTHER PUBLICATIONS

ISA/CA, International Search Report and Written Opinion, dated Aug. 15, 2019, re International PCT Patent Application No. PCT/IB2019/053196.

*Primary Examiner* — Richard G Davis
(74) *Attorney, Agent, or Firm* — PERRY + CURRIER INC.

(57) ABSTRACT

An apparatus an unmanned aerial vehicle recovery system is provided. The apparatus includes a base to mount to an unmanned aerial vehicle. The apparatus further includes a housing to engage the base. In addition, the apparatus includes a parachute disposed within the housing. Also, the apparatus includes a deployment mechanism to deploy the parachute. The deployment mechanism is to eject the housing away from the base upon a triggering event.

33 Claims, 9 Drawing Sheets

(51) Int. Cl.
*B64D 17/70* (2006.01)
*B64D 17/80* (2006.01)
*B64U 70/83* (2023.01)

(56) References Cited

U.S. PATENT DOCUMENTS

| | | | |
|---|---|---|---|
| 2001/0004805 A1 | 6/2001 | Hiroki | |
| 2016/0318615 A1* | 11/2016 | Pick | B64C 39/024 |
| 2016/0332738 A1* | 11/2016 | Hiisilä | B64C 39/024 |
| 2017/0225792 A1* | 8/2017 | Wang | B64D 17/70 |

FOREIGN PATENT DOCUMENTS

| | | |
|---|---|---|
| CN | 205819574 U | 12/2016 |
| CN | 107054666 A | 8/2017 |
| CN | 206511133 U | 9/2017 |
| CN | 107804467 A | 3/2018 |
| CN | 108058833 A | 5/2018 |
| DE | 2554227 A1 | 6/1977 |
| KR | 101845045 B1 | 4/2018 |
| WO | WO-2016025444 A1 | 2/2016 |

\* cited by examiner

UNMANNED AERIAL VEHICLE RECOVERY SYSTEMS AND METHODS

FIELD

The present specification relates generally to unmanned aerial vehicle recovery, and more particularly to unmanned aerial vehicle recovery systems and methods using a parachute.

BACKGROUND

Unmanned aerial vehicles are used in a wide variety of applications. It is to be understood that an unmanned aerial vehicle in the present specification may be used to refer to a wide variety of devices and may be used interchangeably with other remotely piloted air systems. Unmanned aerial vehicles may also refer to vehicles operated by artificial intelligence, or programmed to operate in an autonomous mode without user intervention.

Unmanned aerial vehicles may carry peripheral devices such as cameras to take aerial photography, or other sensors for various surveillance applications. In addition, unmanned aerial vehicles may be used to deliver packages. Accordingly, unmanned aerial vehicles may be able to travel a large distance from the operator. In some instances, an unmanned aerial vehicle may be able to travel beyond the line of sight of the operator, such that the unmanned aerial vehicle relies on sensors to navigate and/or maintain a flight path.

Similar to other apparatus with mechanical and electrical components, unmanned aerial vehicles may suffer from failures in various systems. As unmanned aerial vehicles become more complicated and include additional components, more sources of failure may arise. In some cases, a failure may result in a loss of propulsion causing an unmanned aerial vehicle to crash. In other cases, a failure of a system may result in a lost of communication where the unmanned aerial vehicle may continue travel autonomously on "autopilot". If communication cannot be re-established with the unmanned aerial vehicle operating in an autopilot mode prior to running out of fuel, the unmanned aerial vehicle may likely crash.

SUMMARY

In accordance with an aspect of the invention, there is provided an apparatus an unmanned aerial vehicle recovery system. The apparatus includes a base to mount to an unmanned aerial vehicle. The apparatus further includes a housing to engage the base. In addition, the apparatus includes a parachute disposed within the housing. Also, the apparatus includes a deployment mechanism to deploy the parachute. The deployment mechanism is to eject the housing away from the base upon a triggering event.

In accordance with another aspect of the invention, there is provided an unmanned aerial vehicle. The unmanned aerial vehicle includes a body. The unmanned aerial vehicle also includes a propulsion system disposed on the body. The propulsion system is to provide lift. Additionally, the unmanned aerial vehicle includes a flight control system to control the propulsion system. The unmanned aerial vehicle also includes a base to mount to the body. The apparatus further includes a housing to engage the base. In addition, the apparatus includes a parachute disposed within the housing. Also, the apparatus includes a deployment mechanism to deploy the parachute. The deployment mechanism is to eject the housing away from the base upon a triggering event.

In accordance with another aspect of the invention, there is provided a method. The method involves monitoring a flight status of the unmanned aerial vehicle based on information received at a controller. The method also involves identifying a trigger event to result in a loss of flight based on the information. In addition, the method involves deploying a recovery system. Deploying the recovery system involves ejecting a housing away from a base to deploy a parachute.

BRIEF DESCRIPTION OF THE DRAWINGS

Reference will now be made, by way of example only, to the accompanying drawings in which.

DETAILED DESCRIPTION OF THE EMBODIMENTS

As used herein, any usage of terms that suggest an absolute orientation (e.g. "top", "bottom", "front", "back", "up", "down", etc.) are for illustrative convenience and refer to the orientation shown in a particular figure. However, such terms are not to be construed in a limiting sense as it is contemplated that various components will, in practice, be utilized in orientations that are the same as, or different than those described or shown.

As unmanned aerial vehicles become more complicated, unmanned aerial vehicles become more expensive. Furthermore, as the range of unmanned aerial vehicles increases, it becomes more common for an unmanned aerial vehicle to operate at great distances from the operator of the unmanned aerial vehicle. During operation, an unmanned aerial vehicle may experience a failure of one or more systems causing the unmanned aerial vehicle to lose propulsion and thus lose flight capability which typically results in a crash.

An apparatus 10 is provided to facilitate the recovery of an unmanned aerial vehicle undergoing a system failure that may be catastrophic. In particular, the apparatus 10 reduces the damage that may be cause by a crash of the unmanned aerial vehicle by reducing the impact energy when the unmanned aerial vehicle reaches the ground or other landing surface. For example, if a non-recoverable failure of the unmanned aerial vehicle is detected, the apparatus 10 may carry out steps to slow the descent of the unmanned aerial vehicle. The manner by which a failure is detected is not limited and may include monitoring systems within the unmanned aerial vehicle. For example, the apparatus 10 may include sensors to detect when the unmanned aerial vehicle experiences a change in acceleration, a loss of communication, a loss of power, or other system failure that may result in a loss of flight capability. In other examples, the apparatus 10 may also be able to receive a signal from an external source, such as a handheld device to manually deploy the recovery system at any point decided by the user to mitigate damage from a failed unmanned aerial vehicle.

Figure 1:
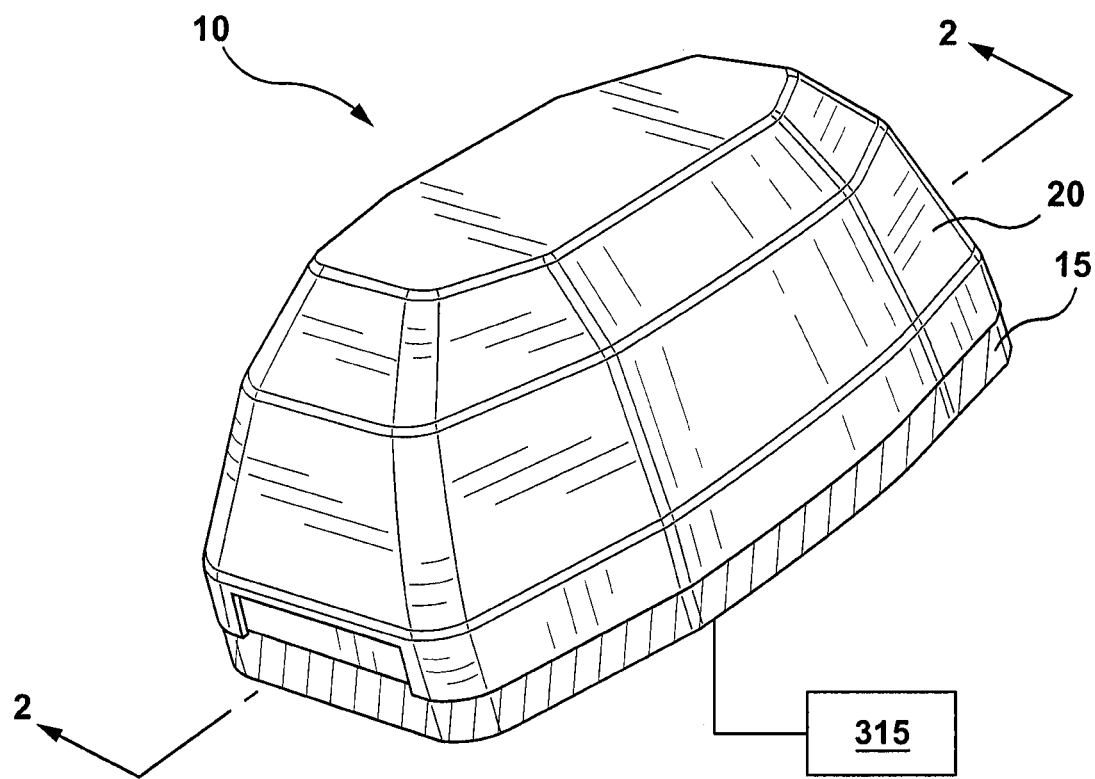
FIG. 1 is a perspective view of an apparatus for an unmanned aerial vehicle recovery system in accordance with an embodiment.
Figure 2:
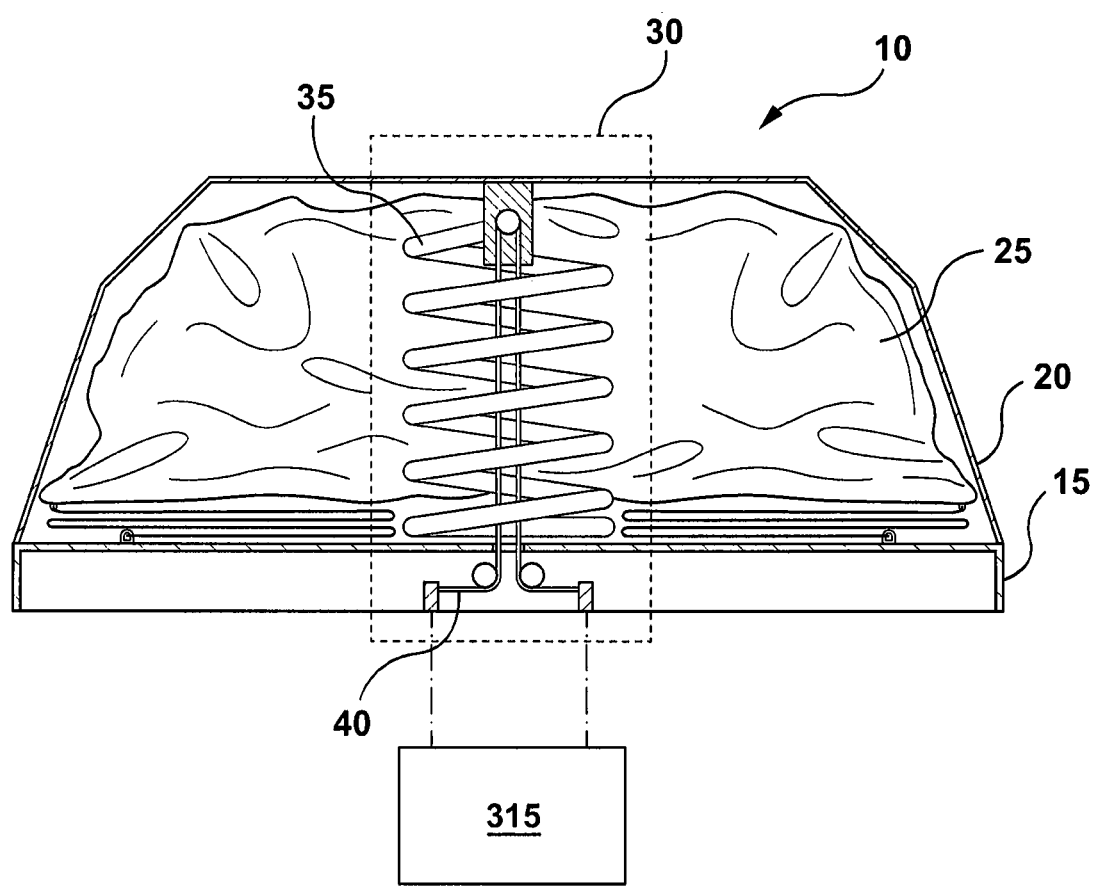
FIG. 2 is a cross sectional view of the apparatus of FIG. 1 through the plane 2-2.

Referring to FIG. 1, a representation of an apparatus for an unmanned aerial vehicle recovery system is generally shown at 10. It is to be understood that the apparatus 10 is purely exemplary and that it will be apparent to those skilled in the art that modifications of the apparatus 10 are contemplated. In the present example, the apparatus 10 includes a base 15 and a housing 20. The apparatus 10 is to be mounted on an unmanned aerial vehicle. In the present example, the apparatus 10 is to be mounted to the unmanned aerial vehicle via the base 15. However, it is to be appreciated that in other in other embodiments, the apparatus 10 may not include the base 15 such that the housing 20 is secured directly to a body and/or frame of the unmanned aerial vehicle. Referring to FIG. 2, a cross sectional view of the apparatus 10 is shown to illustrate the internal components of the apparatus 10. In the present example, the apparatus 10 includes a parachute 25 and a deployment mechanism 30.

The base 15 is to be mounted onto the unmanned aerial vehicle. The manner by which the base 15 is to be mounted to the unmanned aerial vehicle is not particularly limited. In the present example, the base 15 is to be attached to a housing of the unmanned aerial vehicle using fasteners (not shown). For example, the base 15 may be screwed, bolted, or clipped on the housing of the unmanned aerial vehicle. In other examples, the base 15 may be mounted using a friction fit, magnets, adhesives, or welding. It is to be appreciated by a person of skill in the art with the benefit of this description that the base 15 is to be mounted to the unmanned aerial vehicle in such a way that the mounted base 15 can support the weight of the unmanned aerial vehicle as well as any additional force caused by the deployment of the parachute 25 as discussed in greater detail below. For example, the parachute 25 may be configured to support a force about ten times the weight of the unmanned aerial vehicle in order to account for the sudden deceleration during the deployment of the parachute 25. Accordingly, for an unmanned aerial vehicle with a mass of about 4 kilograms, the parachute 25 and attachments may be rated for a minimum force of approximately 400 Newtons in total. It is to be appreciated by a person of skill in the art with the benefit of this description that the rating of the parachute is not particularly limited and that higher or lower ratings may be used depending on the design of the parachute 25. For example, a larger parachute 25 may be configured to handle a larger force due to the larger expected force generated by the larger surface area. In addition, the mass of the unmanned aerial vehicle may also play an important factor designing the support for the parachute 25 where heavier unmanned aerial vehicles may have higher force ratings for the parachute 25.

The location on the unmanned aerial vehicle where the apparatus 10 is to be mounted via the base 15 is not particularly limited. For example, the base 15 may be mounted on an external surface of the unmanned aerial vehicle near the top. In this example, the apparatus 10 may be compatible with any unmanned aerial vehicle having sufficient external surface area for the base 15 to be mounted. Therefore, the apparatus 10 may be mounted to the unmanned aerial vehicle as an aftermarket part as part of a recovery system. In other examples, the apparatus 10 may be designed as part of the unmanned aerial vehicle. In such examples, the parachute 25 may be stored within the unmanned aerial vehicle such that there are no protrusions on an external surface of the unmanned aerial vehicle. It is to be appreciated by a person of skill in the art with the benefit of this description that such examples may provide an unmanned aerial vehicle with improved aerodynamics by integrating the apparatus 10 into the housing.

The housing 20 is to engage the base 15. In the present example, the housing 20 is to contain the contents of the apparatus, such as the parachute 25. It is to be appreciated that the manner by which the housing 20 engages the base is not limited. For example, the housing 20 may be engaged with the base 15 using the deployment mechanism 30 as illustrated in FIG. 2. In this example, the deployment mechanism 30 also secures the housing 20 to the base 15 during normal operation. In other examples, the housing 20 may be secured to the base 15 using a separate mechanism during normal operation. For example, the housing 20 may be secured to the base 15 using clips, adhesives, or other consumable parts that are designed to hold the housing 20 against the base. Before or upon deployment of the parachute, the components may be irreversibly destroyed in some examples. In other examples, the additional components to secure the housing 20 to the base 15 may be reusable, such as a moveable tab.

In the present embodiment, the housing 20 is generally configured to contain the parachute 25. In some examples, the housing 20 may also play a role in the aerodynamics of the unmanned aerial vehicle. Accordingly, the housing 20 may be formed from a rigid or semi-rigid material. It is to be understood by a person of skill in the art with the benefit of this description that the housing 20 is not particularly limited to any material and that several variations of suitable materials may be used. In the present example, the housing 20 may made from materials such as acrylonitrile butadiene styrene (ABS), polylactic acid (PLA), Nylon, other plastics, carbon fiber composites, glass, rubber, wood, metal, and other rigid materials with mechanical properties that are sufficient for containing the parachute 25 and maintaining its shape during flight so that the aerodynamic properties of the unmanned aerial vehicle are not significantly altered during flight.

The housing 20 may also be a reusable component of the apparatus 10 as will be discussed in greater detail below. For example, the housing 20 may be recovered on the ground and re-engaged with the base 15 after the unmanned aerial vehicle has been located.

The parachute 25 is disposed within the housing 20. In the present example, the parachute 25 is to slow the descent of an unmanned aerial vehicle to the ground after the unmanned aerial vehicle experiences a system failure causing the unmanned aerial vehicle to lose flight capabilities. The parachute 25 operates by creating a drag for as the unmanned aerial vehicle descends to the ground. Accordingly, the parachute 25 may be made from a light, strong material that is foldable. In the present example, the parachute 25 is connected to the base 15. However, it is to be appreciated that in other examples, the parachute 25 may be connected to other anchor points on the unmanned aerial vehicle to distribute the load across a wider area of the unmanned aerial vehicle. In such examples, the mounting mechanism of the base 15 to the body of the unmanned aerial vehicle may be less strong since the mounting mechanism does not support the full load of the unmanned aerial vehicle.

In the present example, the parachute 25 is made from a Nylon fabric. In other examples, the parachute may be made from silk, plastic film, or other suitable fabric material or fabric-like material. It is to be appreciated by a person of skill in the art with the benefit of this description that the size and shape of the parachute 25 is not particularly limited. For example, the parachute 25 may be a conventional round parachute. In other examples, the parachute 25 may include cuts, be another shape, or include features to provide a steering function. Furthermore, the size of the parachute 25 may also be adjusted to achieve a desired landing speed as well as for packing purposes within the housing 20. For example, if the unmanned aerial vehicle had a known mass, such as about 4 kilograms, a parachute 25 may have a dimension of about 2 to 3 square meters. In other examples where the unmanned aerial vehicle is heavier or may be used to carry a load, the parachute 25 may be larger to maintain the same landing speed. Alternatively, if the unmanned aerial vehicle is lighter, the parachute 25 may be decreased in size such that the housing 20 may also be decreased in size to improve aerodynamics of the unmanned aerial vehicle during normal operation as well as decrease the weight of the apparatus 10 as a whole.

The deployment mechanism 30 is to deploy the parachute 25. In the present example, the deployment mechanism 30 is to eject the housing 20 away from the base 15 upon a triggering event. It is to be appreciated by a person of skill in the art with the benefit of this description that upon the housing 20 being ejected away from the base 15, the parachute 25 may be deployed to slow the descent of an unmanned aerial vehicle.

The manner by which the deployment mechanism 30 ejects the housing 20 is not particularly limited. For example, the deployment mechanism 30 may include a biasing member 35 to push the housing 20 away from the base 15. In particular, the biasing member 35 may be a compressed spring. In the present example, the spring has an equilibrium length of about 13 centimeters that may be compressed to about 3 centimeters to provide a spring force of about 225 Newtons. It is to be appreciated that the spring may be substituted with another spring having different characteristics such as a larger or smaller physical size as well as applying more or less spring force. Furthermore, in other examples, the biasing member 35 may not be a spring and may instead be a suitable alternative such as a leaf spring, a spring arm, or other mechanism, such as compressed gas. Additional variations may include using a chemical reaction to deploy the parachute 25, or an explosive material, such as gun powder.

During normal operation, the biasing member 35 may be held in a compressed state using a wire 40 connecting the base 15 to the housing 20. The wire 40 is not particularly limited and may be made from any material having physical properties capable of carrying out the intended function of holding the biasing member 35 in the compressed state. In particular, the wire 40 is to be sufficiently strong to hold the biasing member 35 in the compressed state without substantially deforming or stretching. In some examples, multiple wires may be used or the wire 40 may be wound between the base 15 and the housing 20 to obtain sufficient strength. Accordingly, the wire 40 may be used to secure the housing 20 to the base 15. In some examples, additional mechanisms such as adhesives may also be used to improve the securing of the housing 20. In the present example, the wire 40 may be a fuse wire connected to an external power supply 315. The power supply 315 is not limited and may be part of the unmanned aerial vehicle on which the apparatus 10 is mounted. In some examples, the power supply 315 may be the same power supply used to operate the unmanned aerial vehicle. In other examples, the power supply 315 may be a separate power supply on the unmanned aerial vehicle reserved for the apparatus 10. Accordingly, upon a triggering event, the power supply 315 may provide sufficient current across the wire 40 to cause the wire 40 to melt. Once the wire 40 no longer has the mechanical strength to hold the biasing member 35 in the compressed state, the biasing member 35 will urge the housing 20 away from the base 15 and thus deploy the parachute 25.

In other examples, the wire 40 may be made from non-conductive materials such as nylon, polyvinylidene fluoride, polyethylene, or other suitable synthetic materials. Upon the triggering event, the wire 40 may be cut to release the biasing member 35, which results in the deployment of the parachute 25. The manner by which the wire 40 is cut is not limited. For example, the wire 40 may be cut using mechanical means, such as a knife edge or a spring loaded shear. In other examples, the wire 40 may be melted with a heat source such as flame, or a resistive heating element, such as a glow wire in contact with the wire 40.

Figure 3:
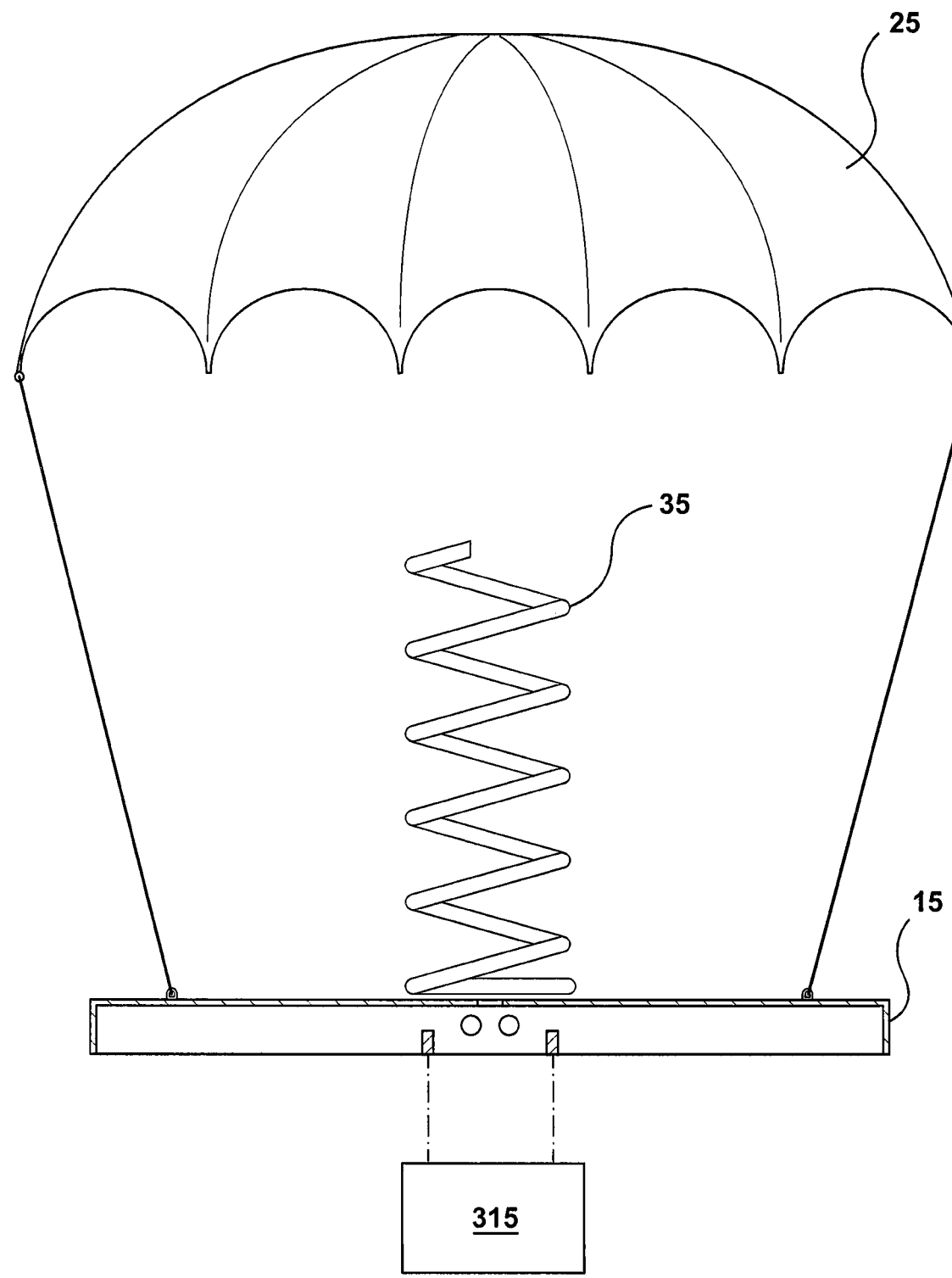
FIG. 3 is a view of the apparatus of FIG. 1 in a deployed state.

Referring to FIG. 3, a representation of an apparatus for an unmanned aerial vehicle recovery system with the parachute 25 deployed is shown. It is to be appreciated that the apparatus 10 may be deployed as shown in FIG. 3. As discussed above, the biasing member 35 is now extended to the equilibrium length. Furthermore, it is to be noticed in this example that the housing 20 has been ejected. In some examples, the housing 20 may be recovered after landing on the ground during use. However, in other examples, the housing 20 may be a single use component. In addition, it is to be noted that the wire 40 is also no longer present once the parachute 25 is deployed in this example.

Figure 4:
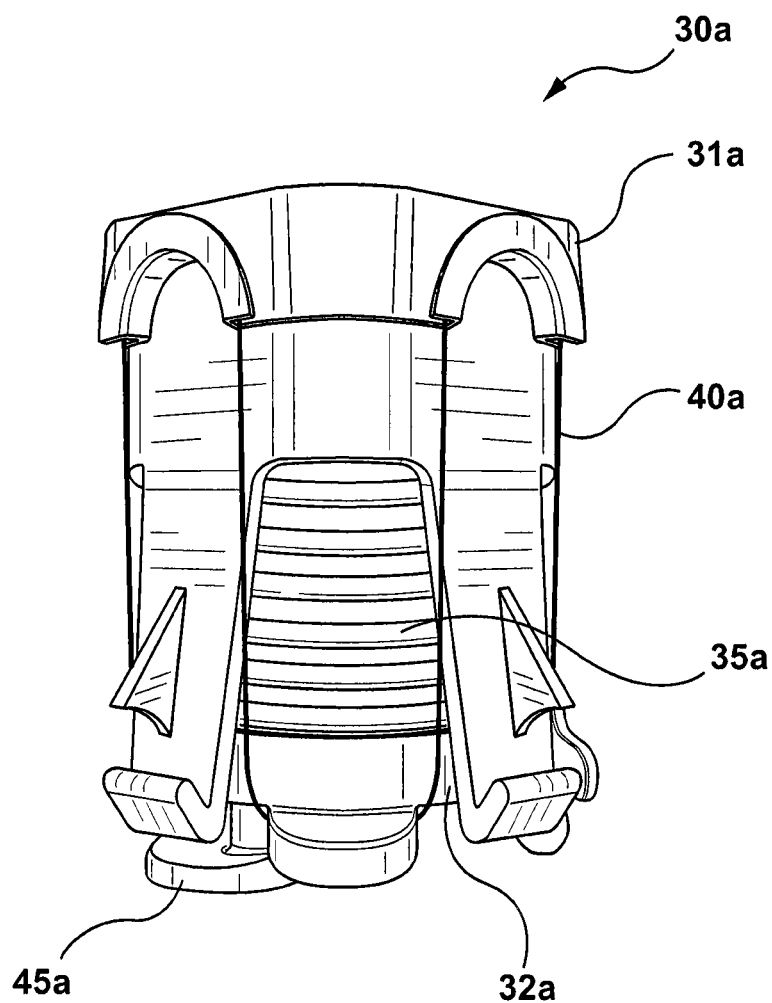
FIG. 4 is a perspective view of a deployment mechanism for an unmanned aerial vehicle recovery system in accordance with another embodiment.

Referring to FIG. 4, another example deployment mechanism is generally shown at 30a. Like components of the deployment mechanism 30a bear like reference to their counterparts in the deployment mechanism 30, except followed by the suffix "a". The deployment mechanism 30a includes a housing attachment 31a, a base attachment 32a, a spring 35a, a wire 40a, and a cutting element 45a.

The housing attachment 31a is configured to mate with the base attachment 32a. Accordingly, the housing attachment 31a and the base attachment 32a co-operate to provide a quick manner by which the spring 35a may be compressed so that the deployment mechanism 30a may be inserted into an apparatus after it is loaded. For example, the housing attachment 31a and the base attachment 32a may co-operate to guide together for aligning the spring 35a during compression. In addition, the housing attachment 31a and the base attachment 32a may provide contact points for a user's fingers to further facilitate compression of the spring 35a.

The deployment mechanism 30a further includes a cutting element 45a to sever the wire 40a. By severing the wire 40a, the spring 35a is free to expand to its equilibrium length. Accordingly, by expanding to its equilibrium length, the spring will push the housing attachment 31a and the base attachment 32a apart. The manner by which the cutting element 45a severs the wire 40a is not limited. In the present example, the cutting element 45a includes a heat source to melt the wire 40a causing the wire to sever. The specific heat source provided by the cutting element 45a may include a resistive heating element, such as a glow wire, in contact with the wire 40a. In other examples, the cutting element 45a may include lighting a small flame at the wire 40a or a plasma arc to melt the wire 40a. In other examples, the cutting element 45a may also be a mechanical manner to sever the wire using a knife edge or other sharp instrument.

Figure 5:
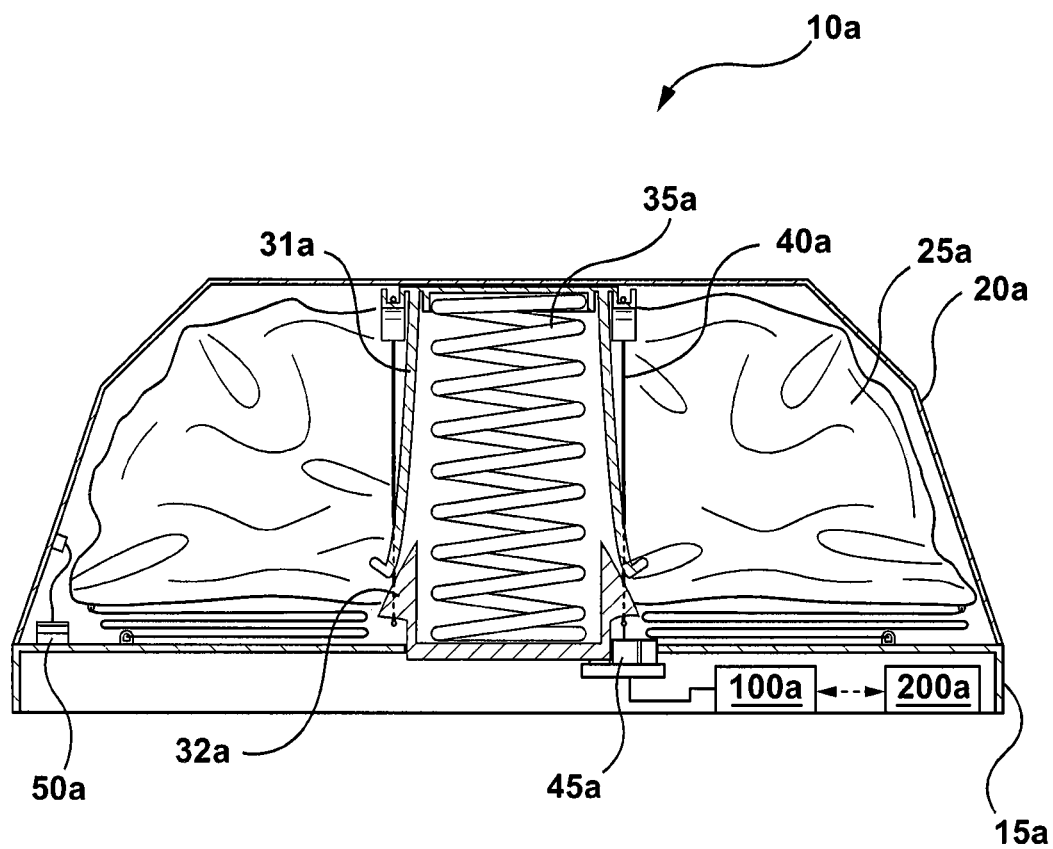
FIG. 5 is a cross sectional view of an apparatus in accordance with another embodiment.

Referring to FIG. 5, another example of an apparatus for an unmanned aerial vehicle recovery system is generally shown at 10a which is to use the deployment mechanism 30a. Like components of the apparatus 10a bear like reference to their counterparts in the apparatus 10, except followed by the suffix "a". The apparatus 10a includes a base 15a and a housing 20a. The apparatus 10a is also to be mounted on an unmanned aerial vehicle. In the present example, the apparatus 10a is to be mounted to the unmanned aerial vehicle via the base 15a. In the present example, the apparatus 10a also includes a parachute 25a and a deployment mechanism 30a. Furthermore, the apparatus 10a includes a retention mechanism 50a, a power supply 100a and a controller 200a.

Figure 6:
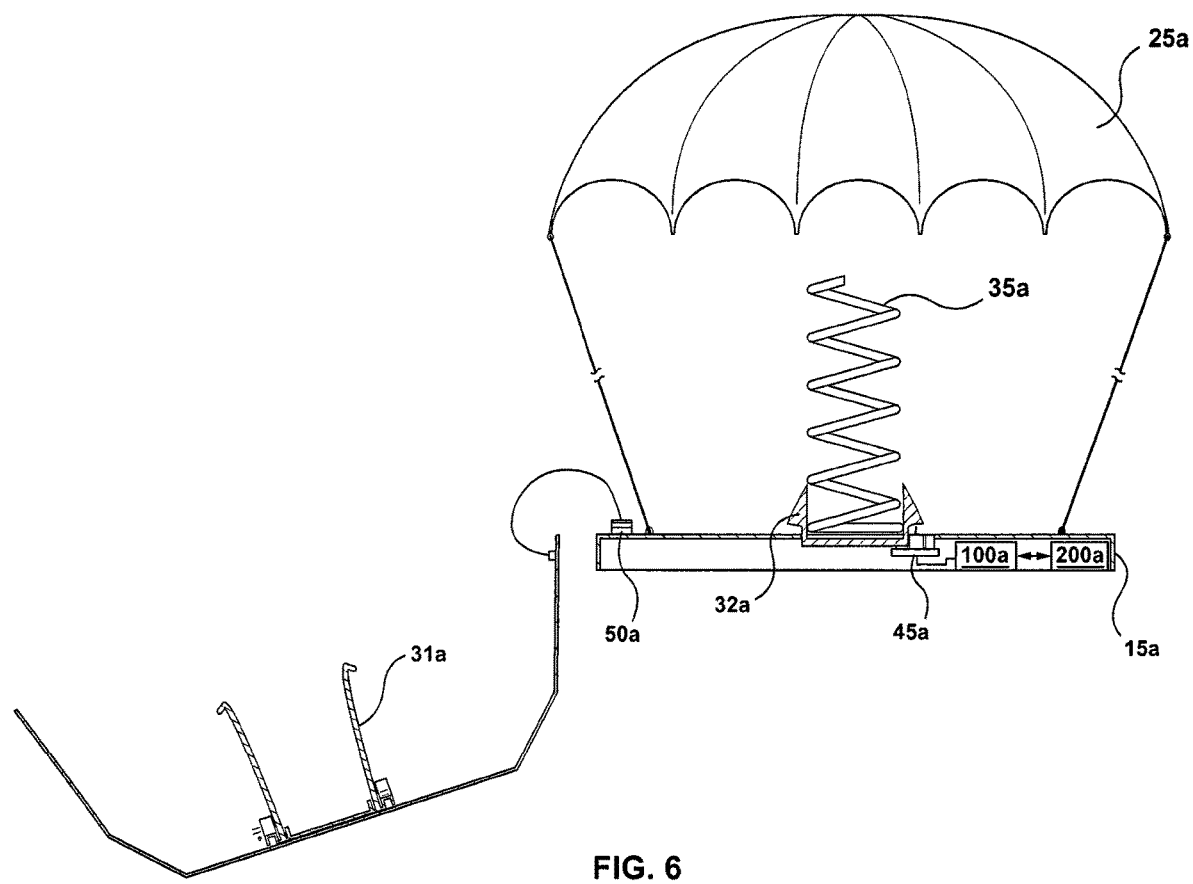
FIG. 6 is a view of the apparatus of FIG. 5 in a deployed state.

The retention mechanism 50a is connected to the housing 20a to allow for recovery of the housing 20a after the parachute 25a has been deployed. It is to be appreciated by a person of skill in the art that the retention mechanism 50a is not particularly limited. In the present example, the retention mechanism 50a is a wire connecting the housing 20a to the base 15a. Accordingly, once the parachute 25a is deployed in this example, the housing 20a will hang from the base 15a as shown in FIG. 6. Therefore, once the unmanned aerial vehicle reaches the ground, the housing 20a would be attached to the base 15a such that the housing 20a may then be reused. In addition, it is to be appreciated by a person of skill with the benefit of this description, the by retaining the housing 20a, the amount of debris falling is mitigated. This feature may reduce the potential for property damage or injury when operating the unmanned aerial vehicle in a densely populated area. In other examples, the retention mechanism 50a may be connected to the body or frame of the unmanned aerial vehicle. In another example, the retention mechanism 50a may be connected to the deployed parachute 25a, such that the housing 20a will rest on top of the parachute 25a or hang off the parachute 25a provided that the housing 20a is sufficiently lightweight to not cause the parachute 25a to collapse.

In the present example, the power supply 100a is not limited and may be part of the base 15 of the apparatus 10. In some examples, the power supply 100a may be similar to the power supply used to operate the unmanned aerial vehicle, such as a battery. In other examples, the power supply 100a may be a different power source. Accordingly, upon a triggering event, the power supply 100a is to provide sufficient current to operate the cutting element 45a to sever the wire 40a. Once the wire 40a is severed, the biasing member 35 will urge the housing 20a away from the base 15a and thus deploy the parachute 25a.

In the present example, the controller 200a is to control the deployment mechanism 30a. The manner by which the controller 200a controls the deployment mechanism 30a is not particularly limited. In the present example, the controller 200a directly controls the power supply 100a for supplying power to the cutting element 45a upon the identification of a triggering event.

The manner by which the controller 200a identifies a triggering event is not limited. In the present example, a triggering event may include events that likely will result in the loss of flight of the unmanned aerial vehicle. For example, the controller 200a may be configured to communicate with the flight control system of an unmanned aerial vehicle. Accordingly, the controller 200a may receive flight information. The controller 200a may then analyze the flight information to determine a likelihood of another failure. Upon the determination that the unmanned aerial vehicle is experiencing or will experience a system failure that will result in the loss of flight, the controller 200a may deploy the parachute 25a. In addition, the controller 200a may also send a shutdown command to the systems of the unmanned aerial vehicle to avoid any further actions by the flight system. It is to be appreciated by a person of skill in the art with the benefit of this description that by communicating with the flight control system of the unmanned aerial vehicle, the controller 200a may be mitigating damage that may be caused by further operation of the propulsion system of the apparatus.

In other examples, the controller 200a may identify a triggering event using sensors controlled by the controller 200a. In particular, such an example will be a stand alone system such that there will be no reliance on systems of the unmanned aerial vehicle. In such examples, the apparatus 10a may be an additional component operating completely independently of the unmanned aerial vehicle. For example, the apparatus 10a may include sensors such as an accelerometer, or a global positioning system to enforce a geofence. It is to be appreciated that in addition to using the sensors to identify a triggering event, the sensors may be used to track the unmanned aerial vehicle to locate the unmanned aerial vehicle. In addition, the sensors of the apparatus 10a may be used to generate log data which may be used to diagnose and address any issues with the unmanned aerial vehicle.

In yet another example, the controller 200a may also include a receive to receive commands remotely. In this example, the controller 200a may receive a command to stop flight an deploy the parachute 25a.

Figure 7:
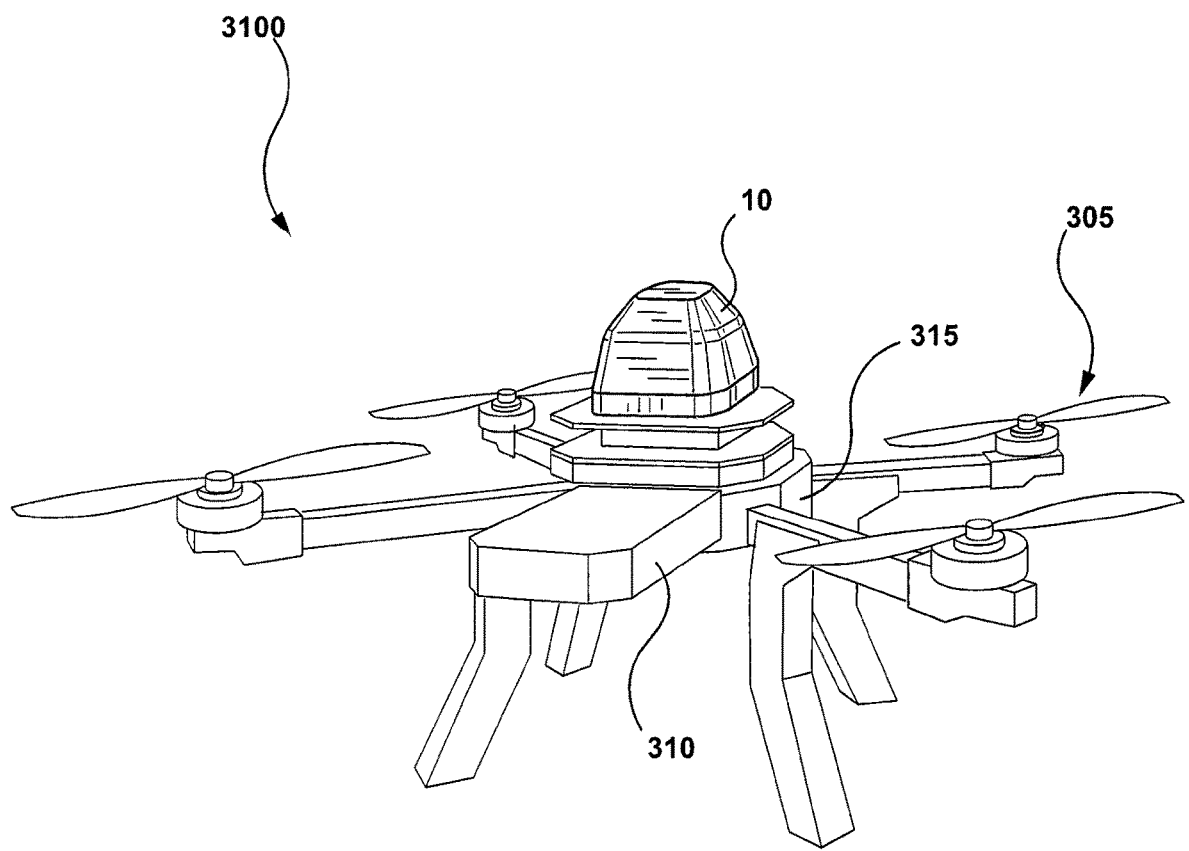
FIG. 7 is a perspective view of an unmanned aerial vehicle with a recovery system in accordance with an embodiment.

Referring to FIG. 7, a representation of an unmanned aerial vehicle is generally shown at 300. It is to be understood that the unmanned aerial vehicle 300 is purely exemplary and that it will be apparent to those skilled in the art that modifications of the unmanned aerial vehicle 300 are contemplated. In the present example, the unmanned aerial vehicle 300 includes a propulsion system 305, a flight control system 310, and a power supply 315. The unmanned aerial vehicle 300 also includes the apparatus 10 mounted thereon.

In the present example, the propulsion system 305 includes a plurality of rotors to provide lift to the unmanned aerial vehicle 300. In this example, the rotors may tilt to provide movement of the unmanned aerial vehicle 300. It is to be appreciated that the propulsion system 305 is not particularly limited and that other systems may be used. For example, the unmanned aerial vehicle 300 may not be a multi-rotor device and instead be a fixed wing device where the propulsion system 305 may include a propeller system, or a jet turbine. The unmanned aerial vehicle 300 may also be a single rotor device, such as a helicopter, or hybrid device capable of fixed wing flight as well as having the ability to carry out vertical take-off and landings.

The flight control system 310 is to control the operation of the unmanned aerial vehicle 300. In the present example, the flight control system 310 is to send and receive signals from an external device (not shown). Accordingly, the flight control system 310 may include a communication interface capable of wireless communications. The external device is not particularly limited and may be a central computer system operating the unmanned aerial vehicle 300. In other examples, the external device may be a portable device operated by a user such as a smartphone, tablet, laptop, etc.

The flight control system 310 may also send data to the external device to provide information about the unmanned aerial vehicle 300 such as speed, location, altitude, etc. This data may be used to operate the unmanned aerial vehicle 300 by a computer system automatically, such as to move the unmanned aerial vehicle 300 along a predetermined flight path. The data may also be used by a user to control the unmanned aerial vehicle 300 via the portable device when the user does not have visual sight of the unmanned aerial vehicle 300. Furthermore, the flight control system 310 may operate the unmanned aerial vehicle 300 using artificial intelligence.

The flight control system 310 may also monitor the status of the unmanned aerial vehicle 300 and carry our periodic system checks to determine if a triggering event has occurred where the apparatus 10 for recovery is to be deployed. The triggering event is not limited, but may include events such as failure of the propulsion system due to loss of power or collision or a failure in one of the control systems. Upon the identification of the triggering event, the flight control system 310 may take immediate steps to shut down the system to mitigate damage. This may involve stopping the rotors of the propulsion system to reduce the likelihood of damaging the parachute 25 during deployment. At about the same time, or shortly after, the flight control system may send a current from the power supply 315 to the apparatus 10 to deploy the parachute. The flight control system 310 may also send data to the external device to communicate that a failure has occurred and that the apparatus 10 has been deployed. In examples where location data is known, the flight control system 310 may also send the location information to the external device.

Figure 8:
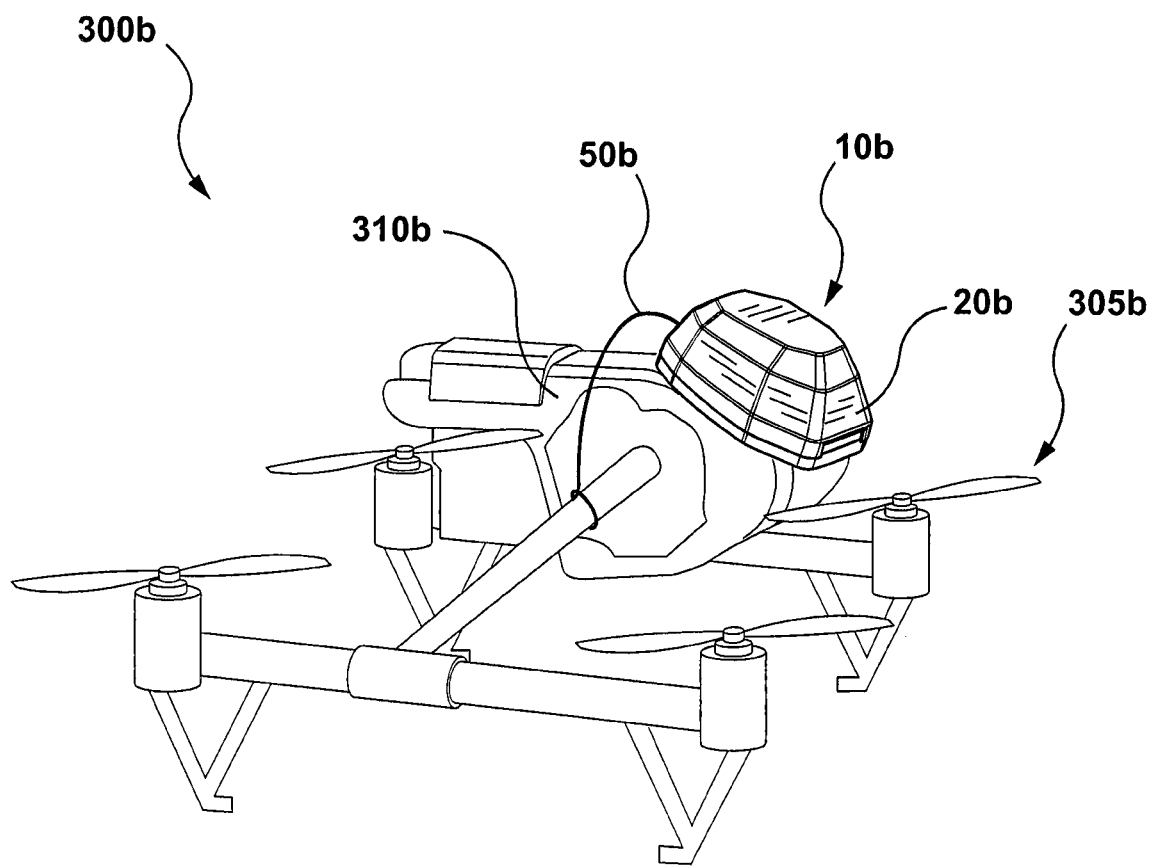
FIG. 8 is a perspective view of an unmanned aerial vehicle with a recovery system in accordance with another embodiment.

Referring to FIG. 8, another example of an unmanned aerial vehicle is generally shown at 300b. Like components of the unmanned aerial vehicle 300b bear like reference to their counterparts in the unmanned aerial vehicle 300, except followed by the suffix "b". The unmanned aerial vehicle 300b includes a propulsion system 305b and a flight control system 310b. The unmanned aerial vehicle 300b also includes the apparatus 10b mounted thereon.

In the present example, the unmanned aerial vehicle 300b further includes a retention mechanism 50b to connect the housing 20b of the apparatus 10b to a portion of the body.

The retention mechanism 50b is to allow for recovery of the housing 20b after the apparatus 10b has been deployed. It is to be appreciated by a person of skill in the art that the retention mechanism 50b is not particularly limited. In the present example, the retention mechanism 50b is a wire connecting the housing 20b to a portion of the unmanned aerial vehicle 300b, such as the airframe. Accordingly, once the apparatus 10b is deployed in this example, the housing 20b will hang from the unmanned aerial vehicle 300b away from other portions of the deployed apparatus 10b, such as the parachute. Therefore, once the unmanned aerial vehicle 300b reaches the ground, the housing 20b would be easily located to be subsequently reused. In addition, it is to be appreciated by a person of skill with the benefit of this description, the by retaining the housing 20b, the amount of debris falling from the unmanned aerial vehicle 300b is mitigated. Accordingly, by reducing the amount of falling debris, the potential for property damage or injury when operating the unmanned aerial vehicle 300b in a densely populated area is also reduced.

Figure 9:
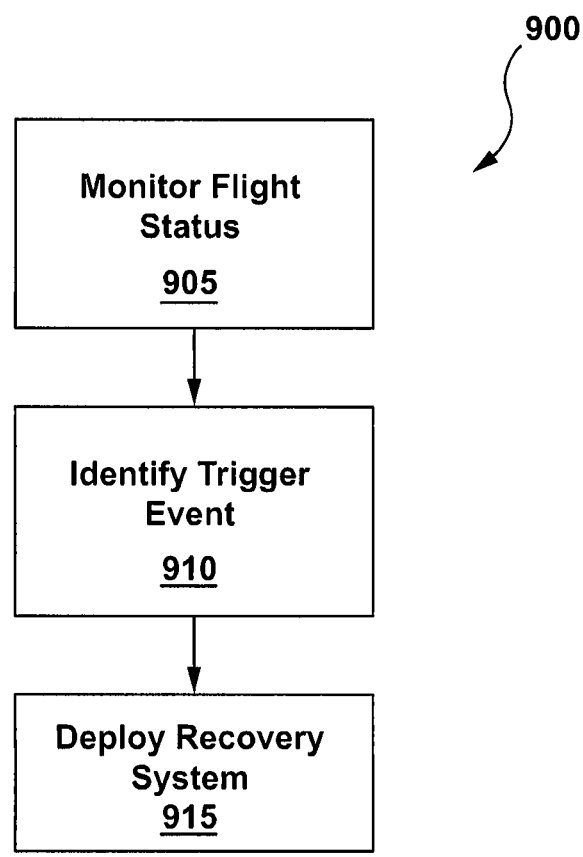
FIG. 9 is a flowchart of an example method of unmanned aerial vehicle recovery.

Referring to FIG. 9, a flowchart of an example method to generating a suitability metric to determine if an upgrade is suitable for a client device is generally shown at 900. In order to assist in the explanation of method 900, it will be assumed that method 900 may be performed with the apparatus 10a. Indeed, the method 900 may be one way in which the apparatus 10a along with the unmanned aerial vehicle may be configured. Furthermore, the following discussion of method 900 may lead to a further understanding of the apparatus 10a. In addition, it is to be emphasized, that method 900 may not be performed in the exact sequence as shown, and various blocks may be performed in parallel rather than in sequence, or in a different sequence altogether.

Beginning at block 905, the controller 200a monitors the flight status of an unmanned aerial vehicle on which the apparatus 10a is mounted. The manner by which the controller 200a monitors the flight status is not limited. For example, the controller 200a may include various sensors such as an accelerometer, a gyroscope, a global positioning system, proximity sensors, light sensors, an airspeed sensor, an altimeter, etc. It is to be appreciated by a person of skill with the benefit of this description, that the controller 200a may receive data from the flight control system of the unmanned aerial vehicle or from another source.

Block 910 comprises identifying a triggering event that may result in the loss of flight by the controller 200a in the present example. The manner by which the controller identifies a triggering event is not particularly limited. For example, the controller 200a receive data from various sensors at block 905. The controller 200a may subsequently compare the values against threshold values. In the event that any value exceeds a threshold value, the controller 200a may identify the triggering event to begin the process of deploying the apparatus 10a. It is to be appreciated that the identification process is not limited and that the process may involve additional tests to confirm that a triggering event that may result in the loss of flight is occurring. For example, the unmanned aerial vehicle may include redundant sensors and the execution of block 910 may confirm a sensor value Block 915 comprises deploying the recovery system upon the identification of a trigger event. The manner by which the recovery system is deployed is not particularly limited. In the present example, deploying the recovery system involves deploying the parachute 25a to mitigate potential damage to the unmanned aerial vehicle by reducing the impact velocity with the ground or another object. It is to be appreciated that the recovery system may involve other steps in addition to deploying the parachute 25a automatically by the controller 200a or manually by a user. For example, the apparatus 10a may store or transmit data about the unmanned aerial vehicle prior to the triggering event for the purposes investigating a cause of the failure. In other examples, the apparatus 10a may also transmit location data to an external device to facilitate the process of locating the unmanned aerial vehicle.

While specific embodiments have been described and illustrated, such embodiments should be considered illustrative only and should not serve to limit the accompanying claims.

What is claimed is:

1. An apparatus for an unmanned aerial vehicle recovery system, the apparatus comprising:
   a base to mount to an unmanned aerial vehicle;
   a housing to engage the base;
   a parachute disposed within the housing;
   a deployment mechanism to deploy the parachute, wherein the deployment mechanism is configured to eject the housing away from the base upon a triggering event, wherein the deployment mechanism includes a biasing member configured to push the housing away from the base, wherein the biasing member is a spring, wherein the spring is compressed with a wire, wherein the deployment mechanism deploys the parachute by melting the wire, and wherein the wire is made from non-conductive material.

2. The apparatus of claim 1, further comprising a retention mechanism connected to the housing for subsequent recovery.

3. The apparatus of claim 2, wherein the retention mechanism is further connected to the base.

4. The apparatus of claim 1, wherein the housing is reusable.

5. The apparatus of claim 1, further comprising a controller configured to control the deployment mechanism.

6. The apparatus of claim 5, wherein the controller is in communication with a flight control system of the unmanned aerial vehicle.

7. The apparatus of claim 6, wherein the controller is configured to receive flight information from the flight control system.

8. The apparatus of claim 7, wherein the controller is configured to deploy the parachute automatically based on the flight information.

9. The apparatus of claim 8, wherein the controller is configured to send a shutdown command to the flight control system before a deployment of the parachute.

10. The apparatus of claim 5, wherein the controller includes a receiver configured to receive a signal from a remote device to deploy the parachute.

11. The apparatus of claim 1, wherein the non-conductive material is a synthetic material.

12. The apparatus of claim 11, wherein the synthetic material one of nylon, polyvinylidene fluoride or polyethylene.

13. An unmanned aerial vehicle comprising:
a body;
a propulsion system disposed on the body, the propulsion system to provide lift;
a flight control system to control the propulsion system;
a base mounted on the body;
a housing to engage the base;
a parachute disposed within the housing; and
a deployment mechanism to deploy the parachute, wherein the deployment mechanism is configured to eject the housing away from the base upon a triggering event, wherein the deployment mechanism includes a biasing member to push the housing away from the base, wherein the biasing member is a spring, wherein the spring is compressed with a wire, wherein the deployment mechanism deploys the parachute by melting the wire, and wherein the wire is made from non-conductive material.

14. The unmanned aerial vehicle of claim 13, further comprising a retention mechanism connected to the housing for subsequent recovery.

15. The unmanned aerial vehicle of claim 14, wherein the retention mechanism is further connected to the body.

16. The unmanned aerial vehicle of claim 14, wherein the retention mechanism is further connected to the parachute.

17. The unmanned aerial vehicle of claim 13, wherein the housing is reusable.

18. The unmanned aerial vehicle of claim 13, further comprising a controller disposed in the base, wherein the controller is configured to control the deployment mechanism.

19. The unmanned aerial vehicle of claim 18, wherein the controller is in communication with the flight control system.

20. The unmanned aerial vehicle of claim 19, wherein the controller is configured to receive flight information from the flight control system.

21. The unmanned aerial vehicle of claim 20, wherein the controller is configured to deploy the parachute automatically based on the flight information.

22. The unmanned aerial vehicle of claim 21, wherein the controller is configured to send a shutdown command to the flight control system before a deployment of the parachute.

23. The unmanned aerial vehicle of claim 18, wherein the controller includes a receiver to receive a signal from a remote device to deploy the parachute.

24. The unmanned aerial vehicle of claim 13; wherein the non-conductive material is a synthetic material.

25. The unmanned aerial vehicle of claim 24, wherein the synthetic material one of nylon, polyvinylidene fluoride or polyethylene.

26. A method of recovering an unmanned aerial vehicle, the method comprising:
monitoring a flight status of the unmanned aerial vehicle based on information received from a sensor;
identifying a trigger event to result in a loss of flight based on the information; and
deploying a recovery system, wherein deploying the recovery system involves ejecting a housing away from a base to deploy a parachute, wherein ejecting the housing comprises pushing the housing away from the base with a biasing member, wherein deploying the recovery system comprises melting a wire holding the biasing member, and wherein the wire is made from non-conductive material.

27. The method of claim 26, further comprising retaining the housing for subsequent recovery.

28. The method of claim 26, further comprising controlling a deployment of the parachute via a controller disposed in the base.

29. The method of claim 26, wherein deploying the recovery system comprises deploying the parachute automatically.

30. The method of claim 26, further comprising sending a shutdown command to a flight control system.

31. The method of claim 28, further comprising sending location information to an external device after deploying the recovery system.

32. The method of claim 26, wherein the non-conductive material is a synthetic material.

33. The method of claim 32, wherein the synthetic material one of nylon, polyvinylidene fluoride or polyethylene.

* * * * *